US009722680B2

(12) United States Patent
Werner et al.

(10) Patent No.: US 9,722,680 B2
(45) Date of Patent: Aug. 1, 2017

(54) SIGNALING OF ANTENNA ASSOCIATIONS (71) Applicant: Telefonaktiebolaget L M Ericsson (publ), Stockholm (SE)

(72) Inventors: Karl Werner, Segeltorp (SE); Robert Baldemair, Solna (SE); Håkan Björkegren, Täby (SE); Erik Dahlman, Stockholm (SE); Stefan Parkvall, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 14 days.

(21) Appl. No.: 14/759,441

(22) PCT Filed: Jun. 25, 2015

(86) PCT No.: PCT/SE2015/050742
§ 371 (c)(1),
(2) Date: Jul. 7, 2015

(87) PCT Pub. No.: WO2016/209130
PCT Pub. Date: Dec. 29, 2016

(65) Prior Publication Data
US 2016/0380684 A1  Dec. 29, 2016

(51) Int. Cl.
*H04B 7/024*   (2017.01)
*H04B 7/04*    (2017.01)
(Continued)

(52) U.S. Cl.
CPC .......... *H04B 7/0465* (2013.01); *H04B 7/024* (2013.01); *H04B 7/0413* (2013.01);
(Continued)

(58) Field of Classification Search
CPC ... H04W 52/34; H04W 72/14; H04W 72/044; H04B 7/0465; H04B 7/0426; H04B 7/024; H04L 1/0009
See application file for complete search history.

(56) References Cited

U.S. PATENT DOCUMENTS 7,436,768 B2 * 10/2008 Yun .......................... H04L 47/24
370/230.1
8,259,658 B2 *  9/2012 Nishio ..................... H04B 7/12
370/329
(Continued)

FOREIGN PATENT DOCUMENTS

EP    2654333 A1   10/2013

OTHER PUBLICATIONS

Unknown, Author, "Discussion on Antenna Ports Co-location", Ericsson, ST-Ericsson, 3GPP TSG RANWG1 Meeting #68bis, Jeju, Korea, R1-121026, Mar. 26-30, 2012, 1-3.
(Continued)

*Primary Examiner* — Jean B Corrielus
(74) *Attorney, Agent, or Firm* — Murphy, Bilak & Homiller, PLLC (57) ABSTRACT

For future wireless systems, it is desired to keep network implementation aspects, such as transmission point selection, precoder selection, etc, transparent to the terminal. This means that terminals are envisaged to be unaware of e.g. from which specific network node a transmission is made. This may be referred to as the transparency principle. The proposed solution comprises enabling a receiver to determine a type of antenna association that may be assumed in regard of two blocks of information, based on the result of the decoding of e.g. the first data block. The determination is done in a way such that the principle of transparency is not broken.

26 Claims, 6 Drawing Sheets

(51) Int. Cl.
*H04B 7/0413* (2017.01)
*H04B 7/0426* (2017.01)
*H04W 52/34* (2009.01)
*H04W 72/04* (2009.01)
*H04W 72/14* (2009.01)

(52) U.S. Cl.
CPC .......... *H04B 7/0426* (2013.01); *H04W 52/34* (2013.01); *H04W 72/044* (2013.01); *H04W 72/14* (2013.01)

(56) References Cited

U.S. PATENT DOCUMENTS

| | | | |
|---|---|---|---|
| 8,948,305 B2* | 2/2015 | Murakami | H04L 25/03171 375/267 |
| 2002/0003846 A1* | 1/2002 | Khayrallah | H03M 13/2957 375/341 |
| 2003/0142772 A1* | 7/2003 | Weiss | H04B 1/0003 375/372 |
| 2012/0020437 A1* | 1/2012 | Furudate | H04L 25/0204 375/316 |
| 2014/0092944 A1* | 4/2014 | Khayrallah | H04B 7/0697 375/219 |
| 2015/0111568 A1 | 4/2015 | Sorrentino et al. | |
| 2015/0180631 A1* | 6/2015 | Zhang | H04W 72/02 370/329 |

OTHER PUBLICATIONS

Unknown, Author, "Transmission modes and OCL behavior in NCT", Qualcomm Incorporated, 3GPP TSG RAN WG1 #74, R1-133575, Barcelona, Spain, Aug. 19-23, 2013, 1-2.

* cited by examiner

SIGNALING OF ANTENNA ASSOCIATIONS

TECHNICAL FIELD

The invention relates to signaling of information in a wireless communication system.

BACKGROUND

In wireless communication systems, signals, such as radio signals, are used for conveying information over an air interface from a transmitter to a receiver. The signals propagate through air from the transmitter to the receiver over a radio channel, and are typically modulated and encoded e.g. in order to be more resistant against the influence of the radio channel. As part of the process of decoding a wireless transmission, the radio channel over which the transmission was conveyed is often analyzed and characterized. Examples of characterization includes e.g. forming a channel estimate, determining time and frequency offset of the transmission relative to an internal reference, and/or determining directional information. The better the quality of the characterization, the better is the performance of the decoding process.

Having a good estimate, or, more general, characterization of the radio channel at the transmitter is also beneficial as such. For example, characterization may allow the transmitter to adapt transmission parameters, such as precoder weights, scheduling decisions, and/or parameters related to modulation and channel coding.

In 4G and also most likely in future wireless systems, characterization of the radio channel is obtained using reference symbols. Reference symbols are inserted in the data stream, but, unlike the data symbols, the reference symbols are known to the receiver a priori. The assumption taken is that the reference signals experience a radio channel that is related to the radio channel experienced by the data symbols.

It is well known that increasing the amount of reference signals in the transmission will increase the quality of the channel characterization. However, increasing the amount of reference signals, e.g. increasing reference signal density, power or similar, comes with a cost in terms of overhead.

SUMMARY

For future wireless systems, it is desired to keep network implementation aspects, such as transmission point selection, precoder selection, etc, transparent to the terminal. This means that terminals are envisaged to be unaware of e.g. from which specific network node a transmission is made. Herein, this will be referred to as the transparency principle. The proposed solution comprises enabling a receiver to determine a type of antenna association that may be assumed in regard of two blocks of information, based on the result of the decoding of e.g. the first data block. The determination is done in a predictable way such that the principle of transparency is not broken.

The disclosed determination of antenna association enables a node e.g. to characterize a channel using reference symbols in a first block of information and apply the result to the processing (transmit or receive) of a second block of information. This will lead to improved performance while keeping the implementation flexibility as desired. One advantage of the provided solution is e.g. that a node may determine whether channel estimation/characterization can be performed jointly for a first and a second block of information, or not. The determining may be based on information conveyed in or by the first block, or a third block, together with configured rules.

According to a first aspect, a method is provided, which is to be performed by a first node operable in a wireless communication network. The method comprises obtaining information from the network, indicating a relation between a transmission characteristic of a first block of information and a transmission characteristic of a second block of information, wherein the indicated relation concerns an antenna association. The provided method further comprises adapting a reception or transmission of the second block of information based on the indicated relation.

According to a second aspect, a method is provided, which is to be performed by a second node in a wireless communication network. The method comprises determining a relation between a transmission characteristic of a first block of information and a transmission characteristic of a second block of information, wherein the relation concerns an antenna association. The provided method further comprises indicating the determined relation to a first node.

According to a third aspect, a first node is provided, which is operable in a wireless communication network. The first node is configured to obtain information from the network, indicating a relation between a transmission characteristic of a first block of information and a transmission characteristic of a second block of information, wherein the indicated relation concerns an antenna association. The first node is further configured to adapt a reception or transmission of the second block of information based on the indicated relation.

According to a fourth aspect, a second node is provided, which is operable in a wireless communication network. The second node is configured to determine a relation between a transmission characteristic of a first block of information and a transmission characteristic of a second block of information, wherein the relation concerns an antenna association. The second node is further configured to indicate the determined relation to a first node.

BRIEF DESCRIPTION OF DRAWINGS

The foregoing and other objects, features, and advantages of the technology disclosed herein will be apparent from the following more particular description of embodiments as illustrated in the accompanying drawings. The drawings are not necessarily to scale, emphasis instead being placed upon illustrating the principles of the technology disclosed herein.

FIGS. 1-3 are flowcharts illustrating exemplifying methods performed by a first node according to different embodiments.

DETAILED DESCRIPTION

For future wireless systems it is envisioned that transmissions and also reference symbols are to be transmitted in a more UE specific manner. That is, reference symbols are not to be provided regularly over an area, often denoted cell, as in the prior art systems. For future wireless systems, it is further desired to keep network implementation aspects, such as transmission point selection, precoder selection, etc, transparent to the terminal. That is, terminals are envisaged to be unaware of e.g. from which specific network node a transmission is made. As previously mentioned, this will be referred to as the transparency principle herein.

It is expected to have several types of transmissions specified for such a future wireless system. For example, one defined type of transmission could be used for e.g. control information, and another defined type of transmission could be used for blocks of data.

In order to adhere to the transparency principle described above, it is desirable that a transmitted block of information, of any transmission type, contains all the reference signals needed for decoding of that block. Also, for the same reason, it is important that a receiver of blocks of information must not assume that the channel experienced by one block of information is related to the channel experienced by another block of information. The latter type of association will be denoted antenna association in the following.

Now consider a) a system in which the receiver does not assume that the channel experienced by a first block of information is related to the channel experienced by a second block of information (i.e. assumes no antenna association); and b) a system that does assume that the channels experienced by the two blocks of information are related (i.e. assumes antenna association).

Also, consider a situation, such as a deployment, implementation aspects, etc, in which the two blocks of information are transmitted from the same antenna port so that the channels are in fact related. Then, if the reference symbol density is the same for the systems a) and b), system b) will probably perform better than system a) because it will have a better quality of the channel characterization. Or, if the reference symbol densities are matched according to a given target performance metric, system a) might have a larger reference symbol overhead compared to system b). This is because system b) will be able to use more reference symbols to characterize the channel than system a).

However, in the example above, system b) breaks the transparency principle as described above. This is not desirable as it causes severe restrictions on implementation. This illustrates the problem with the existing solutions.

According to one embodiment described herein, a receiver determines the type of antenna association it may assume between a first and a second block of information based on the result of the decoding of the first block of information. The determined type of association is then used to perform processing of the second block of information. Processing may include either receive processing or transmit processing. The solution described herein also relates to configuring a node e.g. how to perform the determination step and/or how to convey information about an antenna association. The receiver may alternatively determine the type of antenna association it may assume between a first and a second block of information based on the result of the decoding of a third block of information. The principle of transparency is not broken by the solution provided herein.

Note that the first and second blocks of information may be transmitted from different nodes.

Figure 1:
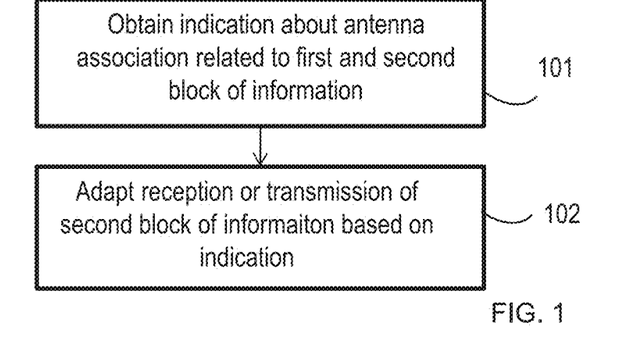
FIG. 1 is a schematic block diagram showing an exemplifying network in which different embodiments may be applied.

Below, exemplifying embodiments will be described with reference to figures. FIG. 1 illustrates generalized embodiment of the solution described herein. The method is to be performed by a first node operable in a wireless communications network. The node may be a wireless device, but in certain embodiments it could also be a radio access node such as a base station. The method illustrated in FIG. 1 comprises obtaining 101 information from the network, indicating a relation between a transmission characteristic of a first block of information and a transmission characteristic of a second block of information. The method further comprises adapting 102 a reception, or transmission, of the second block of information based on the indicated relation.

The determining enable the first node e.g. to characterize the channel based on reference symbols in both blocks of information and apply the result to the decoding of the second block of information, in cases where this is applicable. Alternatively, the determining may enable the first node to characterize the channel based on reference symbols in the first block of information and apply the result to the transmit processing of the second block of information, when this is applicable.

Examples of a first and a second block of information may be e.g. that the first block of information comprises a downlink assignment and the second block of information comprises the corresponding downlink data. Alternatively, the first block of information may contain an uplink scheduling grant and the second block of information may contain the corresponding uplink transmission. Another example may be that the first block of information contains reference symbols transmitted in one link direction, for example uplink or downlink, and the second block of information may be a transmission in the other link direction.

The indicated relation concerns an antenna association, and provides information about which type of antenna association that may be assumed between the two blocks, or rather between the transmission of the two blocks. Differently expressed, an indication is obtained, which provides information about which relation that may be assumed between the channels experienced by the two blocks of information.

It should be noted that the indication is obtained from the network, while the identity of a specific network node currently representing the network may be unknown to a node such as a wireless device communicating with the network. Further, the information may be obtained by a wireless device from a radio access node, or, be obtained by a radio access node from a wireless device.

The information may be obtained in different ways, and the relation may be indicated in different ways, which will be described in more detail below. Further, the adapting can be performed in different ways, which will also be further described below.

The relation between transmission characteristics may concerns different properties. For example, the relation may concern a frequency reference of transmitter(s), such as a relative frequency of local oscillators of the transmitter(s) and/or receiver(s) of the different blocks; the precoder or beamforming weights used, also implying a relation referred to as "channel smoothness", which may also refer to a level of calibration on transmit and receive chains; the antenna ports used for reception or transmission; and/or a location of antenna(s) used for reception of transmission. The relation may alternatively or in addition concern statistical properties of the radio channel, such as delay spread, doppler spread, doppler shift and/or average delay; a time reference of transmitter(s) or receiver(s); and/or power level related properties, such as average gain or transmit power, related to the two blocks of information.

The adapting of a reception or transmission of the second block of information may concern different aspects. The adapting may concern one or more of: adjustment of a time or frequency reference for decoding or transmission based on measurements in the first block of information; computation of channel estimates used for demodulation based on reference signals in the first block of information; and/or adjustment of receiver beam(s) or weight(s) based on directional information obtained from the first block of information. The adapting may alternatively or in addition concern adjustment of a received signal based on a frequency offset determined using the first block of information; selection of a precoder based on channel estimates computed using the first block of information; adjustment of gain control circuitry based of power level measurements of the first block of information; and/or selection of transmit beam(s)/transmit weights based on directional information. The adjustment of gain control circuitry may involve e.g. that the first node adjusts a transmission power of the second block of information based (at least partly) on pathloss measurements made using reference signals in first block (like open loop powercontrol). Alternatively, it may involve that the first node adjusts it receiver to match the signal level of the second block of information based on its relation to the first block of information. This may mean e.g. setting an attenuator level (AGC, automatic gain control) in order to fit signal into dynamic range of ADC (analogue to digital converter).

The obtaining of information may comprise either receiving the first block of information or receiving a third block of information. Expressed differently, the information indicating the relation could be conveyed to the first node by means of the first block of information. Alternatively, the information indicating the relation may be conveyed to the first node by means of a third block of information, which then conveys information concerning a relation between two other blocks.

The relation could be indicated in different ways. For example, the relation could be indicated by an explicit indication in the first block or a third block of information. The explicit indication could have the form of a bit or a bit-sequence which could e.g. constitute an index to a configurable set of rules or to an entry in a table of possible antenna associations. The relation could be indicated implicitly, e.g. by the presence, or correspondingly by the absence, of certain information in the first or third block of information. For example, the presence of a downlink scheduling assignment in the block of information may be configured to indicate a certain type of antenna association. At least one type of relation could be indicated by a configured implicit assumption, i.e., that the first node should assume a certain antenna association if not told otherwise in the first block of information. Further, when the first, or third, block of information comprises an UL scheduling grant and the second block of information is uplink data in response, this could indicate an antenna association of configurable type. The relation could also be indicated by a position of the first, or third, block of information in a time-frequency resource grid relative to the position of the second block of information, for example if the first and second blocks of information overlap in time. In the latter case, the information indicating the relation is not comprised in the block of information itself, but instead carried by the location of the block in terms of transmission resources, such as time-frequency resources. The first node may be configured with a set of rules for how to interpret different indications. The indications may be different depending on whether time division multiplexing or frequency division multiplexing is used.

The first and second block of information could either be obtained or received by the first node, e.g. from a second node. Alternatively, the first block of information could be received by the first node, e.g. from a second node, and the second block of information could be transmitted by the first node to the second node, and/or to one or more nodes other than the one from which the first block of information was received. It should be noted that the first node may be unaware of from which node or nodes a block of information is received, and may further be unaware of which node or nodes that will receive a block of information transmitted by the first node.

Figure 2A:
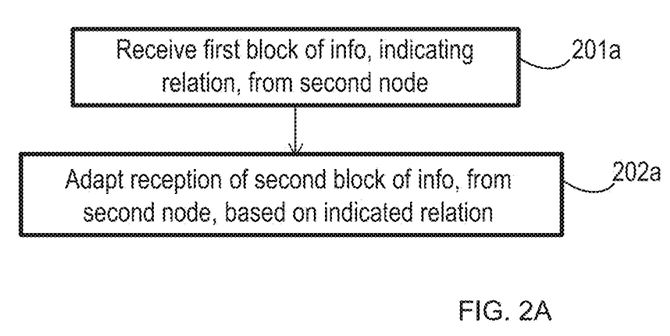
Figure 2B:
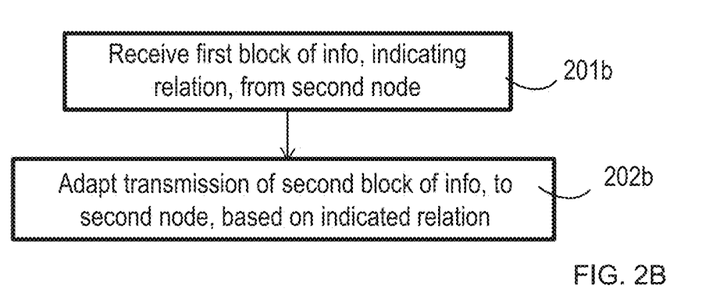
Figure 2C:
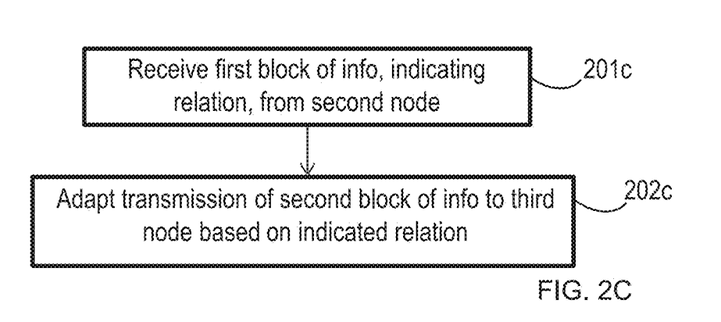

When the indication of the relation is conveyed by means of a third block of information, this block may be assumed to be received by the first node. Some of these alternatives performed by a first node are illustrated in FIGS. 2a-2c. FIG. 2a shows receiving 201a the first block from a second node, and adapting a reception 202a of the second block from the second node. FIG. 2b shows receiving 201b the first block from a second node, and adapting a transmission 202b of the second block to the second node. FIG. 2c shows receiving 201c the first block from a second node, and adapting a transmission 202c of the second block to a third node.

Figure 3:
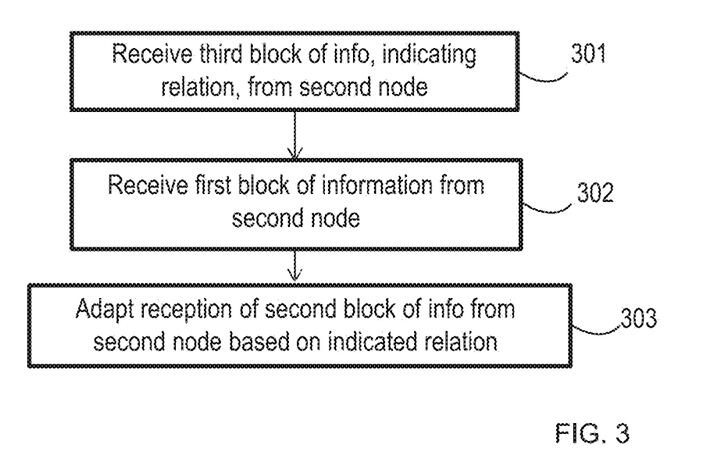

FIG. 3 illustrates an embodiment where the information indicating a relation is conveyed by a third block of information. FIG. 3 shows receiving 301 a third block of information from a second node, and further receiving 302 the first block from the second node. FIG. 3 further shows adapting a reception 303 of the second block of information from the second node. Other alternatives involving the third block of information are also possible, even though not illustrated.

Figure 4:
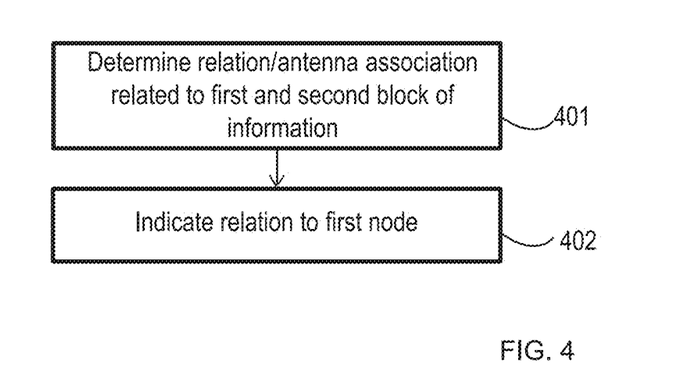
FIG. 4 is a flowchart illustrating an exemplifying method performed by a second node according to an embodiment.

The solution described herein further relates to a second node, which provides the information indicating a relation concerning an antenna association to the first node. The second node may be e.g. a radio access node or a wireless device. An exemplifying embodiment of a method performed by a second node is illustrated in FIG. 4. The method comprises determining 401 a relation between a transmission characteristic of a first block of information and a transmission characteristic of a second block of information, wherein the relation concerns an antenna association. The method further comprises indicating 402 the determined relation to a first node.

By performing these actions, the second node enables the first node to adapt a transmission or reception of the second block of information based on the indicated relation. Since method embodiments related to the second node corresponds to the method embodiments described for the first node above, the description of the embodiments performed by the second node is kept short. The relation may concern different features or properties, as described above, and the relation may be indicated in different ways as described above. The indication may be conveyed in different ways, e.g. by means of a third block of information, and the second node could transmit or otherwise provide the first, second and/or third block of information to the first node, or e.g. transmit the first block and receive the second block, as described above.

According to an exemplifying embodiment, a transmitting node, e.g. a radio access node, transmits a control message to a wireless device, where the control message contains a downlink assignment. The transmitting node also sends downlink data to the wireless device, according to the downlink assignment. Both the control message (first block of information) and the downlink data (second block of information) are transmitted using the same precoder and antennas. Therefore, the transmitting node indicates in the control message that the receiving node may expect channel smoothness across the reference symbols in both blocks of data.

The receiving node decodes the control message (first block of information) pointing to a time frequency resource that contains data intended for the receiving node (second block of information) and a bit field. The bit field is used, together with a rule that is configured e.g. using higher layer signaling, by the receiving node to determine that the reference symbols included in the control message may be used together with the reference symbols in the downlink data block to estimate the channel (characterize) and use the estimate for decoding of the data. If the transmitting node had not indicated this relation (same precoder and antennas for both blocks of information), the receiving node would only have followed the transparency principle and only used the reference symbols comprised in the second block of information for estimating the channel.

Below, an example of how a configuration may be implemented will be described. For example, a receiving node, i.e. receiver of the first block of information, may determine an index based on the first block of information. The receiving node has previously been provided with, e.g. been configured with, information indicating how the index should be derived, e.g. whether it will be explicitly or implicitly signaled, etc. The index may then be mapped to a relation or antenna association type, e.g. using a lookup table. The antenna association type may then be used as a parameter in the decoding algorithm. The lookup table may provide the information needed for making adequate adaptation of a reception or transmission of the second block of information given the index/antenna association at hand. The lookup table may e.g. be statically configured in the receiving node or be configurable using higher layer signaling.

In a system operating with the system control plane, an association rule configuration may be configured using the system control plane. Or, alternatively, there may be an antenna port association between a transmission associated to the system control plane (first block of information) and another transmission (second block of information).

The association rule may be configured by higher layer signaling. Such higher layer signaling may be part of system information transmitted by the network, e.g. broadcasted or transmitted in a terminal specific transmission. It may also be configured using Radio Resource Control, RRC, signaling.

Figure 5:
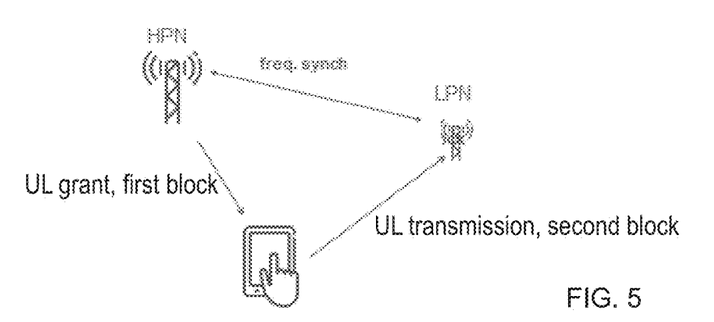
FIGS. 5-8 are signaling diagrams illustrating interaction between nodes in different situations according to different exemplifying embodiments.

FIGS. 5-8 illustrate different scenarios related to the solution described herein. For these examples, it is assumed that the nodes have been configured with a numbered list or record of possible relations or antenna associations types, where:
type 1: transmissions have the same frequency reference;
type 2: channel smoothness;
type 3: directional properties;
type 4: statistical properties, such as coherence BW, coherence time;
type 5: time reference is the same or has a fixed offset Terms given in parentheses below are alternative notations or explanatory comments, when not only stating abbreviations. FIG. 5 shows a situation where a wireless device (first node or receiving node) determines, based on an indication in an UL grant (first block of information) that the transmission of the UL grant (first block of information) is not associated, with respect to directional properties to the transmission of the second block of information (association of type 3). But, the transmissions have the same frequency reference (association of type 1). The wireless device then does not do precoding based on reference signals in the first block of information, but does adjust its internal oscillator to match the UL grant. In FIG. 5, the UL grant is illustrated as transmitted by a High Power Node, HPN, and the second block of information is transmitted to/received by a Low Power Node, LPN. This is, however, just an example.

Figure 6:
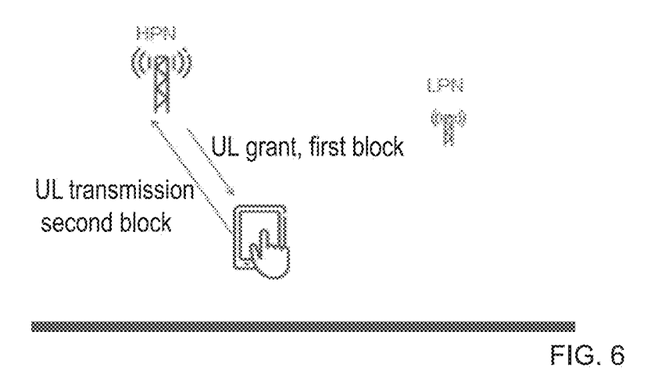

In FIG. 6, a wireless device (first node or receiving node) determines, based on an indication in an UL grant, that the transmission of the UL grant (first block of information) is associated, with respect to directional properties to the transmission of the second block of information (association of type 3). And, implicitly, has the same frequency reference (association of type 1). The wireless device may thus perform modulation, e.g. select precoder, for transmission of the second block of information based on reference signals in the UL grant (first block of information). In FIG. 6, the UL grant is illustrated as transmitted by a High Power Node, HPN, and the second block of information is transmitted to/received by the same HPN. As before, this is just an example.

Figure 7:
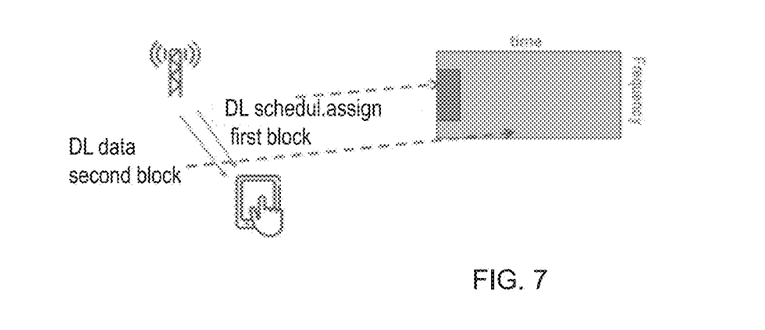

In FIG. 7, a wireless device (first node or receiving node) determines, based on implicit association due to a position in a time frequency grid, (occupies intersecting sets of time domain symbols), as configured, that the transmission of a DL scheduling assignment (first block of information) is associated, with respect to so-called channel smoothness to the transmission of the second block of information (association of type 2). The wireless device may thus use reference signals comprised in the DL scheduling assignment (first block of information) to demodulate the second block of information.

Figure 8:
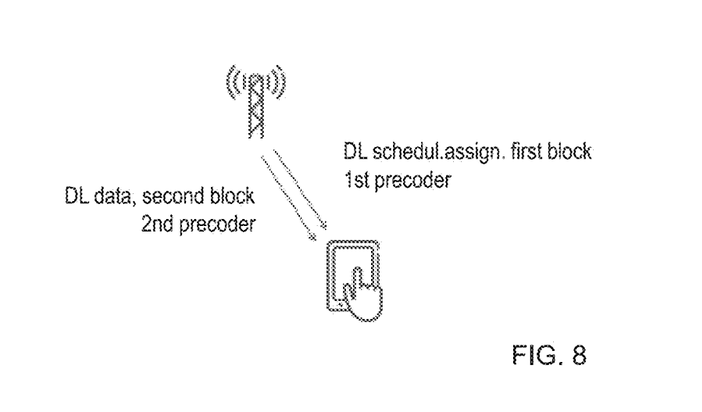

In FIG. 8, a transmitting node (second node) uses different precoders for a first and second block of information, for example due to implementation restrictions and varying sets of co-scheduled users. The wireless device (first node or receiving node) determines, based on an explicit indication, that the transmission of a DL scheduling assignment (the first block of information) is not associated, with respect to so-called channel smoothness to the transmission of the second block of information (association of type 2). The wireless device further determines that the transmission of the DL scheduling assignment (first block of information) is associated, with respect to time and frequency reference to the transmission of the second block of information (association of type 1 and 5). Thereby, the wireless device may use the reference signals comprised in the first block of information to lock in time and frequency for receiving the second block of information, but not to demodulate the second block.

Hardware Implementation:

The methods and techniques described above may be implemented in a wireless communication network, e.g. in nodes, such as wireless devices, radio access nodes, and/or other types of communication devices or nodes. These nodes may be operable in a wireless communication network applying transparency, as described above.

Figure 9A:
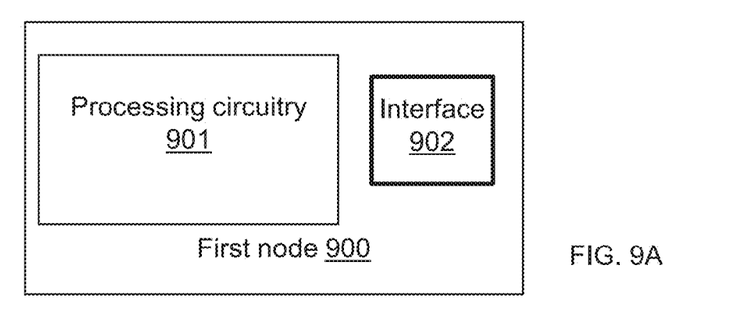
FIGS. 9a-9c are schematic block diagrams illustrating different implementations of a first node according to exemplifying embodiments.
Figure 9B:
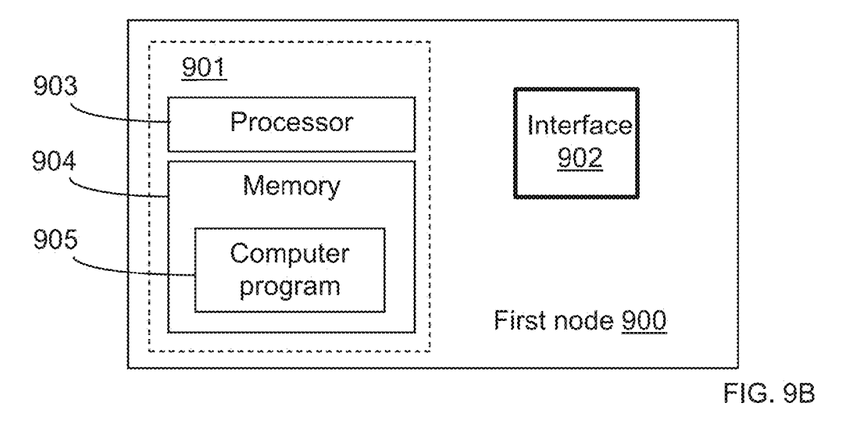
Figure 9C:
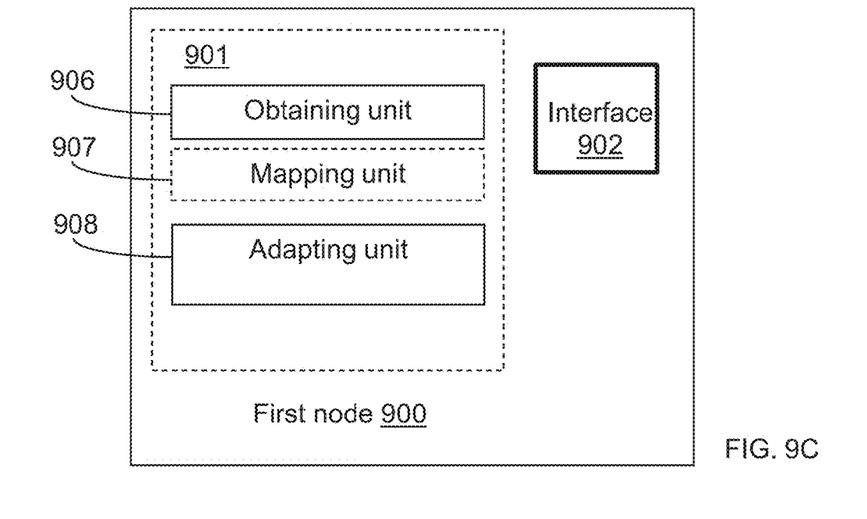

First Node, FIGS. 9a-9c

An exemplifying embodiment of a first node is illustrated in a general manner in FIG. 9a. The first node may, as previously described, be a wireless device configured to be operable in a network applying the transparency principle. The first node 900 is configured to perform at least one of the method embodiments described above with reference to any of FIGS. 1-3 and 5-8. The first node 900 is associated with the same technical features, objects and advantages as the previously described method embodiments. The first node will be described in brief in order to avoid unnecessary repetition.

The first node may be implemented and/or described as follows:

The first node 900 comprises processing circuitry 901 and a communication interface 902. The processing circuitry 901 is configured to cause the first node 900 to obtain information from the network, e.g. from a second node, indicating a relation between a transmission characteristic of a first block of information and a transmission characteristic of a second block of information, wherein the indicated relation concerns an antenna association. The processing circuitry 901 is further configured to cause the first node to adapt a reception or transmission of the second block of information based on the indicated relation. The communication interface 902, which may also be denoted e.g. Input/Output (I/O) interface, includes a network interface for sending data to and receiving data from other nodes.

The processing circuitry 901 could, as illustrated in FIG. 9b, comprise processing means, such as a processor 903, e.g. a CPU, and a memory 904 for storing or holding instructions. The memory would then comprise instructions, e.g. in form of a computer program 905, which when executed by the processing means 903 causes the first node 900 to perform the actions described above.

An alternative implementation of the processing circuitry 901 is shown in FIG. 9c. The processing circuitry here comprises an obtaining unit 906, configured to cause the first node to obtain information from the network, indicating a relation between a transmission characteristic of a first block of information and a transmission characteristic of a second block of information. The processing circuitry further comprises an adapting unit 908, configured to cause the first node to adapt a reception or transmission of the second block of information based on the indicated relation. The processing circuitry could comprise more units, such as e.g. a mapping unit 907 for mapping an obtained indication to an adequate adaptation of a transmission or reception. This task could alternatively be assumed to be performed by one of the other units, e.g. the adapting unit 908, and therefore unit 907 is illustrated with a dashed outline.

The first nodes described above could be configured for the different method embodiments described herein, e.g. in regard of the type of relations, adaptations and indications.

The first node 900 may be assumed to comprise further functionality, for carrying out regular node functions. These functions would be at least partly different depending on whether the first node is a wireless device or a radio access node, such as a base station, and depending on in which type of network it operates.

Figure 10A:
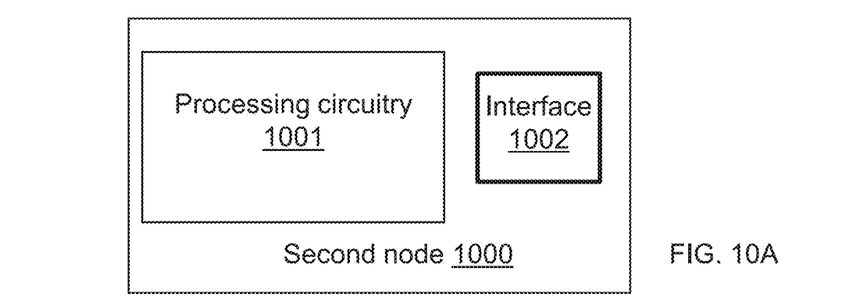
FIGS. 10a-10c are schematic block diagrams illustrating different implementations of a second node according to exemplifying embodiments.
Figure 10B:
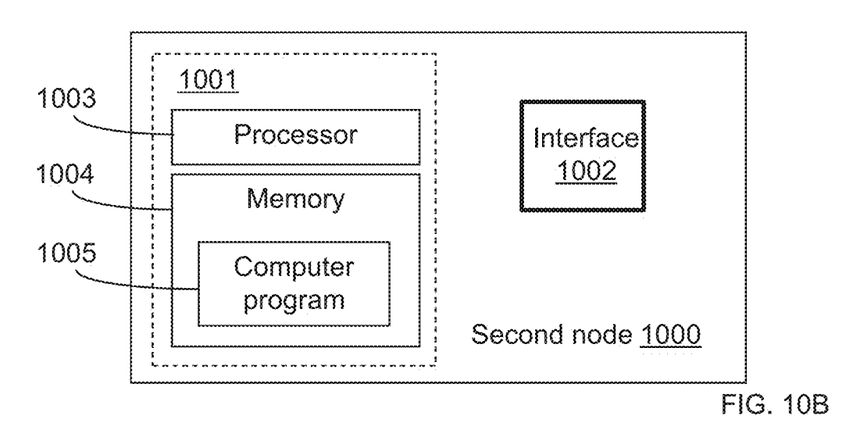
Figure 10C:
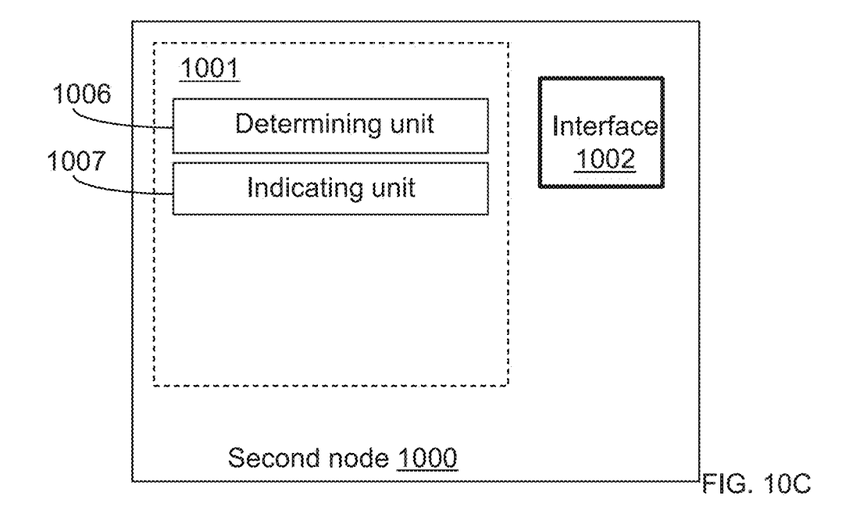

Second Node, FIGS. 10a-10c

Embodiments herein also relate to a second node 1000 being operable in a wireless communication network and being operable to communicate with a first node. An exemplifying embodiment of a second node is illustrated in a general manner in FIG. 10a. The second node 1000 is configured to perform at least one of the method embodiments described above e.g. with reference to any of FIGS. 5-9. The second node 1000 is associated with the same technical features, objects and advantages as the previously described method embodiments. The second node will be described in brief in order to avoid unnecessary repetition.

The second node 1000 comprises processing circuitry 1001 and a communication interface 1002. The processing circuitry 1001 is configured to cause the second node to determine a relation between a transmission characteristic of a first block of information and a transmission characteristic of a second block of information, wherein the relation concerns an antenna association. The processing circuitry 1001 is further configured to cause the second node to indicate the determined relation to a first node. The communication interface 1002, which may also be denoted e.g. Input/Output (I/O) interface, includes a network interface for sending data to and receiving data from other nodes.

The processing circuitry 1001 could, as illustrated in FIG. 10b, comprise processing means, such as a processor 1003, and a memory 1004 for storing or holding instructions. The memory would then comprise instructions, e.g. in form of computer program 1005, which when executed by the processing means 1003 causes the second node 1000 to perform the actions described above.

An alternative implementation of the processing circuitry 1001 is shown in FIG. 10c. The processing circuitry here comprises a determining unit 1006, configured to cause the second node to determine a relation between a transmission characteristic of a first block of information and a transmission characteristic of a second block of information. The processing circuitry further comprises an indicating unit 1006, configured to cause the network control node to indicate the determined relation to a first node.

Thus, the second node is configured and operable to enable the first node to adapt a transmission or reception of the second block of information based on the indicated relation.

The second node 1000 may be assumed to comprise further functionality, for carrying out regular node functions. These functions would be at least partly different depending on whether the second node is a radio access node, such as a base station, or a wireless device, and depending on in which type of network it operates.

The steps, functions, procedures, modules, units and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules, units and/or blocks described above may be implemented in software such as a computer program for execution by suitable processing circuitry including one or more processing units. The software could be carried by a carrier, such as an electronic signal, an optical signal, a radio signal, or a computer readable storage medium before and/or during the use of the computer program in the nodes. The nodes described above may be implemented in a so-called cloud solution, referring to that the implementation may be distributed, and that what is referred to as a node therefore may be a so-called virtual node or a virtual machine.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors, DSPs, one or more Central Processing Units, CPUs, and/or any suitable programmable logic circuitry such as one or more Field Programmable Gate Arrays, FPGAs, or one or more Programmable Logic Controllers, PLCs. That is, the units or modules in the arrangements in the different nodes described above could be implemented by a combination of analog and digital circuits, and/or one or more processors configured with software and/or firmware, e.g. stored in a memory. One or more of these processors, as well as the other digital hardware, may be included in a single application-specific integrated circuitry, ASIC, or several processors and various digital hardware may be distributed among several separate components, whether individually packaged or assembled into a system-on-a-chip, SoC.

It should also be understood that it may be possible to re-use the general processing capabilities of any conventional device or unit in which the proposed technology is implemented. It may also be possible to re-use existing software, e.g. by reprogramming of the existing software or by adding new software components.

The embodiments described above are merely given as examples, and it should be understood that the proposed technology is not limited thereto. It will be understood by those skilled in the art that various modifications, combinations and changes may be made to the embodiments without departing from the present scope. In particular, different part solutions in the different embodiments can be combined in other configurations, where technically possible.

When using the word "comprise" or "comprising" it shall be interpreted as non-limiting, i.e. meaning "consist at least of".

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

The invention claimed is:

1. A method to be performed by a first node operable in a wireless communication network, the method comprising:
   obtaining information from the network, the obtained information indicating a relation between a transmission characteristic of a first block of information and a transmission characteristic of a second block of information, wherein the indicated relation concerns an antenna association; and
   adapting a reception or transmission of the second block of information based on the indicated relation.

2. The method of claim 1, wherein the transmission characteristics comprise one or more of:
   frequency reference of transmitter(s) of the first and second block;
   frequency reference of transmitter(s) of the first block and receiver of the second block;
   precoder/beamforming weights used for the first and second block;
   antenna ports used for reception or transmission of the first and second block;
   location of antenna(s) used for reception or transmission of the first and second block;
   statistical properties of the radio channel associated with the first and second block;
   time reference of transmitter(s) or receiver(s) of the first and second block;
   power level related properties of the two blocks of information.

3. The method of claim 1, wherein the adapting comprises one or more of:
   adjustment of a time or frequency reference for decoding or transmission based on measurements in the first block of information;
   computation of channel estimates used for demodulation based on reference signals in the first block of information;
   adjustment of receiver beam(s) or weight(s) based on directional information obtained from the first block of information;
   adjustment of received signal based on frequency offset determined using first block of information;
   selection of precoder based on channel estimates computed using the first block of information;
   adjustment of gain control circuitry based of power level measurements of the first block of information;
   selection of transmit beam(s)/transmit weights based on directional information.

4. The method of claim 1, wherein the obtaining of information comprises receiving the first block of information.

5. The method of claim 1, wherein the obtaining of information comprises receiving a third block of information.

6. The method of claim 1, wherein the relation is indicated by one of:
   an explicit indication in the first block or a third block of information;
   presence or absence of certain information;
   a position of the first or third block of information in a time-frequency resource grid relative to the position of the second block of information.

7. The method of claim 1, wherein the first and second blocks of information are received by the first node.

8. The method of claim 7, wherein the first and second blocks of information are received from a second node.

9. The method of claim 1, wherein the first block of information is received by the first node and the second block of information is transmitted by the first node.

10. The method of claim 9, wherein the first block of information is received from a second node and the second block of information is transmitted to the second node.

11. The method of claim 9, wherein the first block of information is received from a second node and the second block of information is transmitted to a third node.

12. A method to be performed by a second node in a wireless communication network, the method comprising:

determining a relation between a transmission characteristic of a first block of information and a transmission characteristic of a second block of information, wherein the relation concerns an antenna association; and indicating the determined relation to a first node.

13. The method of claim 12, wherein transmission characteristics comprise one or more of:
frequency reference of transmitter(s) of the first and second block;
frequency reference of transmitter(s) of the first block and receiver of the second block;
precoder/beamforming weights used for the first and second block;
antenna ports used for reception or transmission of the first and second block;
location of antenna(s) used for reception or transmission of the first and second block;
statistical properties of the radio channel associated with the first and second block;
time reference of transmitter(s) or receiver(s) of the first and second block;
power level related properties of the two blocks of information.

14. The method of claim 12, wherein the relation is indicated by one of:
an explicit indication in the first block or a third block of information;
presence or absence of certain information in the first or third block of information; and
a position of the first or third block of information in a time-frequency resource grid relative to the position of the second block of information.

15. The method of claim 12, further comprising:
transmitting the second block of information in accordance with the determined and indicated relation; or
receiving the second block of information in accordance with the determined and indicated relation.

16. A first node operable in a wireless communication network, the first node comprising:
a communication interface configured to send and receive data from one or more other nodes in the wireless communication network; and
processing circuitry;
wherein the processing circuitry is configured to:
obtain information from the network, the obtained information indicating a relation between a transmission characteristic of a first block of information and a transmission characteristic of a second block of information, wherein the indicated relation concerns an antenna association, and
adapt a reception or transmission of the second block of information based on the indicated relation.

17. The first node of claim 16, wherein the transmission characteristics comprise one or more of:
frequency reference of transmitter(s) of the first and second block;
frequency reference of transmitter(s) of the first block and receiver of the second block;
precoder/beamforming weights used for the first and second block;
antenna ports used for reception or transmission of the first and second block;
location of antenna(s) used for reception or transmission of the first and second block;
statistical properties of the radio channel associated with the first and second block;
time reference of transmitter(s) or receiver(s) of the first and second block;
power level related properties of the two blocks of information.

18. The first node of claim 16, wherein the adapting comprises one or more of:
adjustment of a time or frequency reference for decoding or transmission based on measurements in the first block of information;
computation of channel estimates used for demodulation based on reference signals in the first block of information;
adjustment of receiver beam(s) or weight(s) based on directional information obtained from the first block of information;
adjustment of received signal based on frequency offset determined using first block of information;
selection of precoder based on channel estimates computed using the first block of information;
adjustment of gain control circuitry based of power level measurements of the first block of information;
selection of transmit beam(s)/transmit weights based on directional information.

19. The first node of claim 16, wherein the processing circuitry is configured to obtain the information by receiving the first block of information, using the communication interface.

20. The first node of claim 16, wherein the processing circuitry is configured to obtain the information by receiving a third block of information, using the communication interface.

21. The first node of claim 16, wherein the relation is indicated by one of:
an explicit indication in the first block or a third block of information;
presence or absence of certain information in the first or third block of information;
a position of the first or third block of information in a time-frequency resource grid relative to the position of the second block of information.

22. A second node operable in a wireless communication network, the second node comprising:
a communication interface configured to send and receive data from one or more other nodes in the wireless communication network; and
processing circuitry;
wherein the processing circuitry is configured to:
determine a relation between a transmission characteristic of a first block of information and a transmission characteristic of a second block of information, wherein the relation concerns an antenna association; and to
indicate the determined relation to a first node.

23. The second node of claim 22, wherein the transmission characteristics comprise one or more of:
frequency reference of transmitter(s) of the first and second block;
frequency reference of transmitter(s) of the first block and receiver of the second block;
precoder/beamforming weights used for the first and second block;
antenna ports used for reception or transmission of the first and second block;
location of antenna(s) used for reception or transmission of the first and second block;
statistical properties of the radio channel associated with the first and second block;

time reference of transmitter(s) or receiver(s) of the first and second block;

power level related properties of the two blocks of information.

24. The second node of claim 22, wherein the processing circuitry is configured to indicate the relation by one or more of:

an explicit indication in the first block or a third block of information;

presence or absence of certain information in the first or third block of information;

a position of the first or third block of information in a time-frequency resource grid relative to the position of the second block of information.

25. The second node of claim 22, wherein the processing circuitry is further configured to:

transmit the second block of information in accordance with the determined and indicated relation, using the communication interface; or to receive the second block of information in accordance with the determined and indicated relation, using the communication interface.

26. A non-transitory computer-readable medium comprising, stored thereupon, a computer program comprising instructions that, when executed on at least one processor of a first node operable in a wireless communication network, cause the first node to:

obtain information from the network, the obtained information indicating a relation between a transmission characteristic of a first block of information and a transmission characteristic of a second block of information, wherein the indicated relation concerns an antenna association; and adapt a reception or transmission of the second block of information based on the indicated relation.

* * * * *

UNITED STATES PATENT AND TRADEMARK OFFICE
CERTIFICATE OF CORRECTION

PATENT NO. : 9,722,680 B2
APPLICATION NO. : 14/759441
DATED : August 1, 2017
INVENTOR(S) : Werner et al.

It is certified that error appears in the above-identified patent and that said Letters Patent is hereby corrected as shown below:

On the Title Page

On Page 2, in Item (56), under "OTHER PUBLICATIONS", in Column 1, Lines 1-2, delete "OCL behavior in NCT", Oualcomm" and insert -- QCL behavior in NCT", Qualcomm --, therefor.

In the Specification

In Column 2, Line 49, delete "FIGS. 1-3" and insert -- FIGS. 2-3 --, therefor.

In Column 5, Line 13, delete "based of" and insert -- based on --, therefor.

In Column 7, Line 58, delete "offset" and insert -- offset. --, therefor.

In Column 7, Line 65, delete "properties" and insert -- properties, --, therefor.

In Column 8, Line 11, delete "properties" and insert -- properties, --, therefor.

In Column 8, Line 28, delete "smoothness" and insert -- smoothness, --, therefor.

In Column 8, Line 41, delete "smoothness" and insert -- smoothness, --, therefor.

In Column 8, Line 45, delete "reference" and insert -- reference, --, therefor.

In Column 10, Lines 22-23, delete "indicating unit 1006," and insert -- indicating unit 1007, --, therefor.

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,722,680 B2

In the Claims

In Column 12, Line 35, in Claim 3, delete "based of" and insert -- based on --, therefor.

In Column 14, Line 20, in Claim 18, delete "based of" and insert -- based on --, therefor.